March 4, 1969  D. C. HENNING  3,431,335
METHOD AND APPARATUS FOR MAKING FILTERS
Filed Oct. 20, 1966
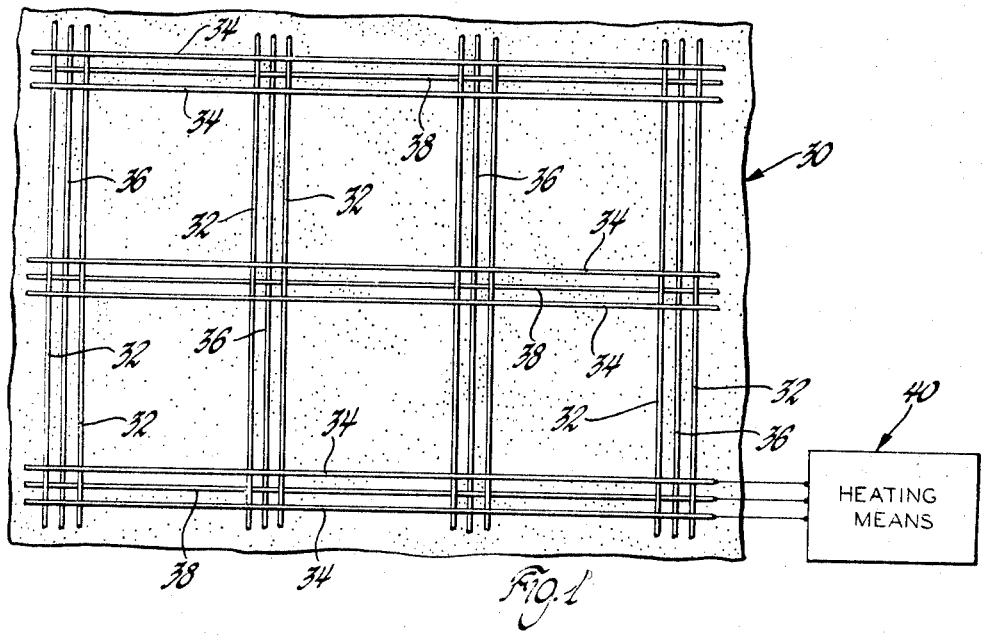
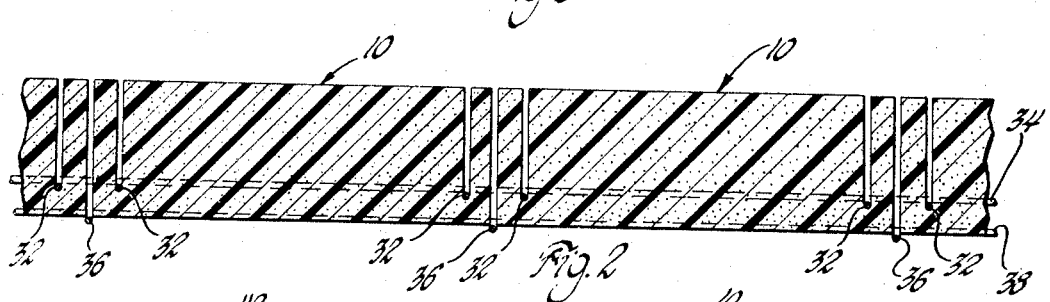
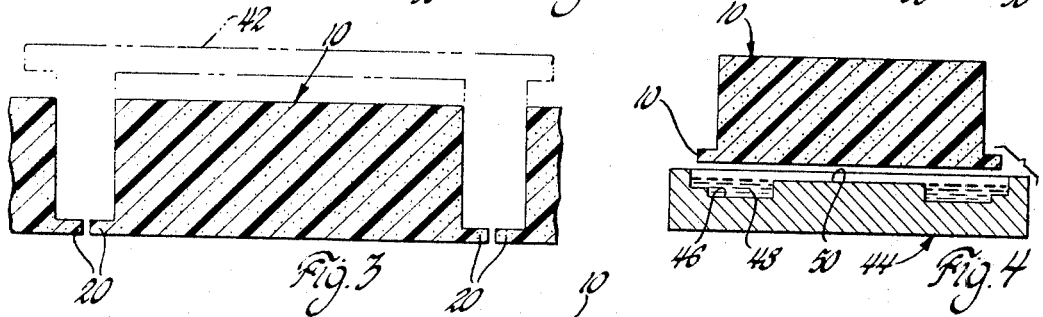
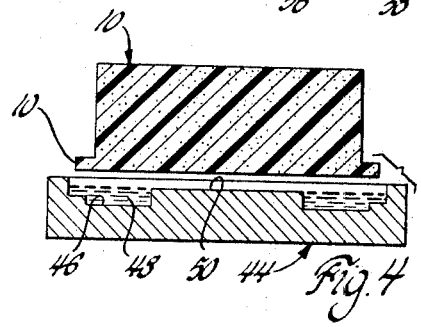
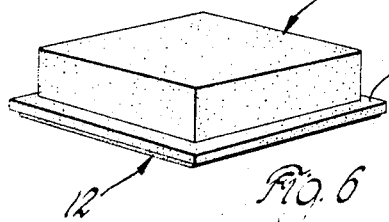
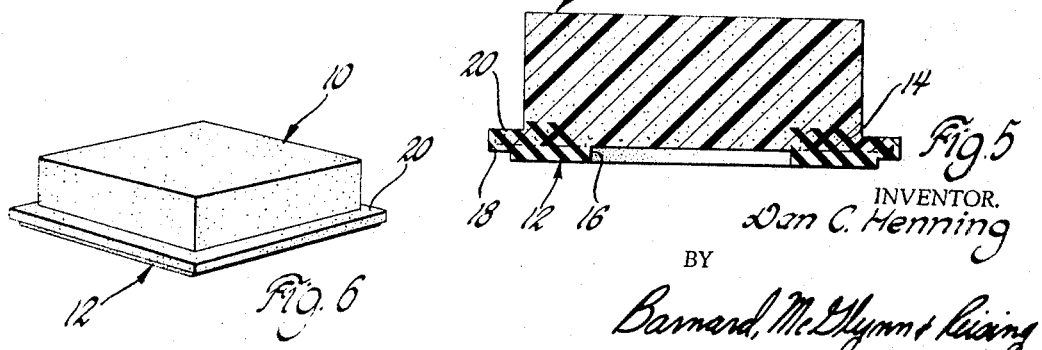
INVENTOR.
Dan C. Henning
BY
Barnard, McGlynn & Reising
ATTORNEYS

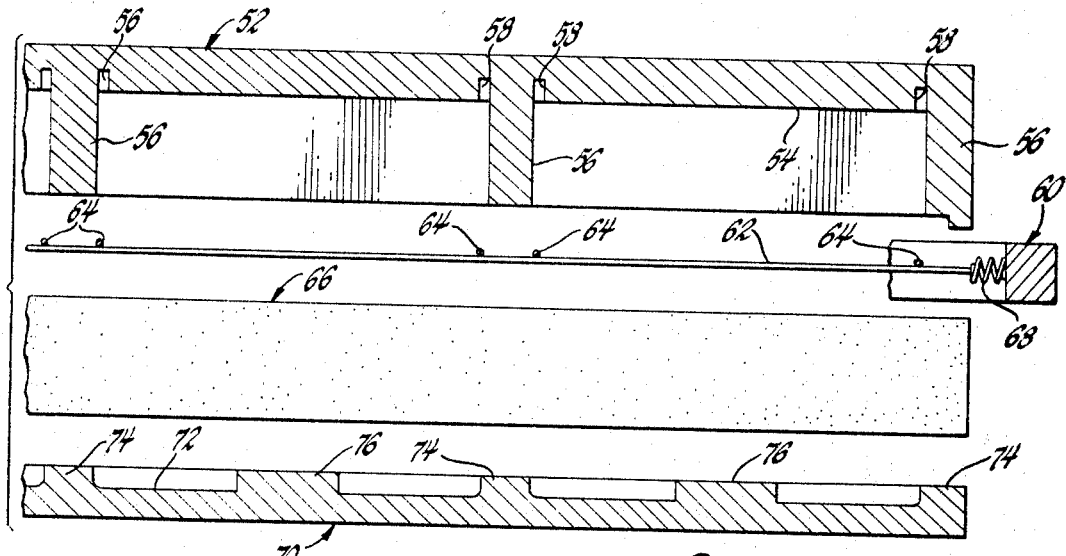
Fig. 7
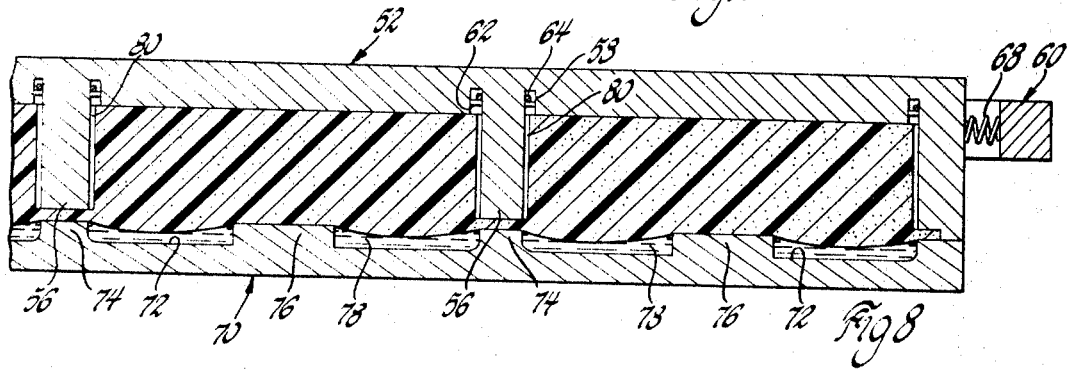
Fig. 8
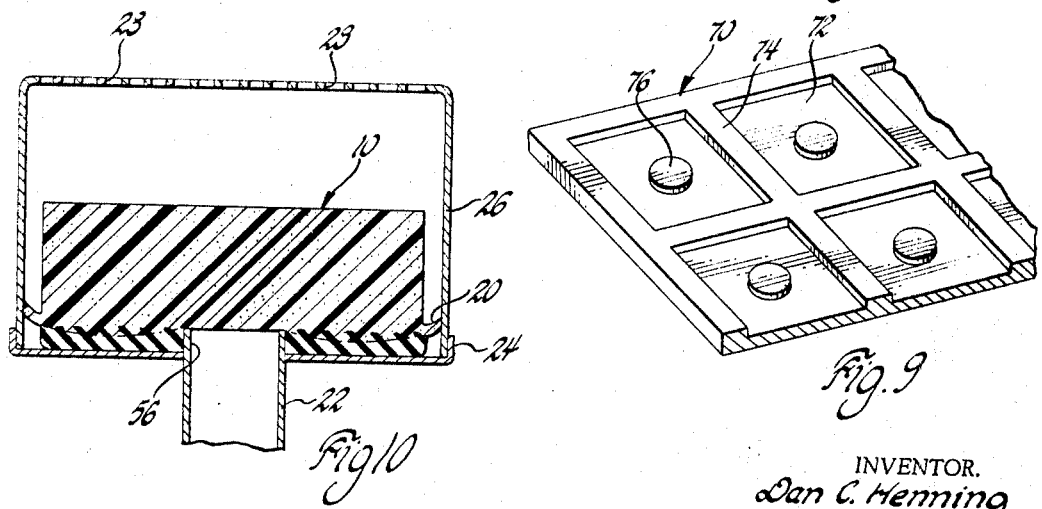
Fig. 10
Fig. 9
INVENTOR.
Dan C. Henning
BY
Barnard, McGlynn & Reising
ATTORNEYS

# United States Patent Office 3,431,335
Patented Mar. 4, 1969

3,431,335
METHOD AND APPARATUS FOR MAKING FILTERS
Dan C. Henning, Milwaukee, Wis., assignor to G. S. Staunton & Company, Inc., Birmingham, Mich., a corporation of Michigan
Filed Oct. 20, 1966, Ser. No. 588,096
U.S. Cl. 264—138                 15 Claims
Int. Cl. B29c 3/00; B29d 27/00

This invention relates to method and apparatus for making filters, and more particularly to method and apparatus for making filters of generally small polygonal shape, having one end thereof embedded in and integrally formed with a plastic material forming an end plate for the filter.

In the design and manufacture of small internal combustion engines, it is desirable to provide some sort of an air filter member to be disposed in the air intake system of the engine for removing particles of dust and dirt from the atmosphere and to prevent such dust and dirt from passing into the interior of the engine and causing damage thereto. In some installations, a filter member has been provided which includes a block of polyurethane foam filter material with a generally rigid end plate formed of a plastic material, the end plate having a lip or flange therearound which serves to seal the filter in the mounting can or housing with which the filter is used. The plastic end plate is provided with an opening of some nature to permit air flow through the block of foam material and through the opening into the intake system of the engine.

It has been discovered that filters of this general type, subject to the heat generated by the operation of the engine, have a tendency to warp or deform at the sealing edge of the plastic base, thus permitting unfiltered air to leak past the sealing edge and into the intake system of the engine. The usual solution to this problem is to provide a strengthening member within the plastic material forming the end plate, such as a steel plate which is of sufficient size and strength to prevent such deflection or warpage. However, this is an expensive solution to the problem, and makes more difficult the manufacturing procedure and process in forming the filter member.

The method and apparatus in which this invention is embodied comprises, generally, providing a series of parallel cuts or slices partially through a batt or blanket of filter material by the use of heated wires, or the like, followed by compressing the filter material between the partial cuts or slices under conditions of heat and pressure to compact the material and form a dense peripheral flange about the filter element. The end of the filter element containing the peripheral flange is then immersed in a plastic material of any suitable kind, and in liquid form, the plastic material filling the interstices in the end portion of the filter element and incorporating some or all of the peripheral flange. The plastic material is then allowed to cure to form a relatively rigid end plate, the incorporation of the peripheral flange providing the strengthening or stabilizing influence to prevent the plastic material from warping or deforming under the heat of the engine operation. In one embodiment of the invention, the peripheral flange extends outwardly beyond the plastic material forming the end plate to provide a flexible seal to engage the housing or container within which the filter member is mounted when in use.

In forming the cuts or slices in the batt of filter material, heated wires in parallel grid-like configuration, with the wires in each pair being relatively closely spaced as compared to the space between pairs of wires, are lowered into the batt or blanket of filter material to a suitable depth to partially separate the potrions of the filter material that are to be compressed to form the peripheral flange. A third heated wire may be disposed between the wires in each pair of wires, and so located as to pass completely through the filter batt as the wires in each pair of wires are making the partial cut or slice. In this manner, a single movement of the wire system will not only provide the portion to be compressed but will also separate small filter elements from the large batt of the filter material.

By the use of method and apparatus as briefly described, and as will be hereinafter more particularly described with reference to the drawings, it is apparent that filter members may be manufactured with ease and facility, making an extremely economical production process for filter members. The wires may be arranged in any suitable configuration, providing great versatility in the manufacture of filter elements of different shapes and sizes, and the entire operation may be easily automated for continuous operation with ease and efficiency.

These and other advantages will become more apparent from the following description and drawings in which:

FIGURE 1 is a plan view of a portion of a batt of filter material and showing a typical configuration of wire elements with respect thereto;

FIGURE 2 is a cross-sectional view of the portion of the batt of filter material shown in FIGURE 1 with the wire system in one position in the cutting process;

FIGURE 3 is a cross-sectional view of a portion of the filter batt illustrated in FIGURE 1, showing the manner in which the peripheral flange is formed;

FIGURE 4 is a sectional schematic view of the filter element formed and shown in FIGURES 1 through 3, and a mold member containing the liquid plastic material;

FIGURE 5 is a cross-sectional view of a filter member manufactured in accordance with the steps illustrated in FIGURES 1 through 4;

FIGURE 6 is a perspective view of the filter member illustrated in FIGURE 5;

FIGURE 7 is an exploded sectional view of apparatus for manufacturing filter members, and showing a batt of filter material between the various members;

FIGURE 8 is a cross-sectional view of the apparatus and filter material illustrated in FIGURE 7, showing the apparatus in closed position;

FIGURE 9 is a partial perspective view of the lower mold member illustrated in FIGURES 7 and 8; and FIGURE 10 is a cross-sectional view of the filter member manufactured in accordance with the apparatus shown in FIGURES 7 through 9, and illustrating the mounting of the filter member in a suitable container.

Referring more particularly to the drawings, FIGURES 5, 6 and 10 best show a typical filter member that may be formed by the method and process herein described. The filter member includes a filter element, indicated generally by the numeral 10, that is formed of suitable material, such a polyurethane foam. Such material will permit passage of air from top to bottom, and will remove therefrom the dust, dirt and other impurities that would be harmful to engine operation. At the lower end of the filter element 10 is a plastic end plate, indicated generally by the numeral 12, the plastic material being incorporated in the foam material of the element 10, as indicated at 14, in the manufacturing process. End plate 12 includes an aperture or opening 16 to permit air flow through the filter element 10, and an outwardly extending peripheral flange 18 which is intended to seal against the container or housing in which the filter member is mounted. The filter element 10 includes a peripheral flange 20 which is also embedded in the plastic material from which the base 12 is made, and serves to strenghten the sealing flange 18 extending around the periphery of the end plate 12.

As illustrated in FIGURE 10, the filter member may be mounted on the intake structure of an engine, indicated by the numeral 22, and within a container including a lower housing member 24 and an upper housing member 26. Upper housing member 26 includes a plurality of apertures or slots 28 to permit air flow into the upper housing 26 where it is passed through the filter material 10 and into the intake structure 22. The peripheral flange 20 on the filter element 10 is shown in sealing engagement with the side wall of the upper container member 26 to prevent air flow between the filter element 10 and the intake member 22.

Referring next to FIGURES 1 through 4, a preferred method of manufacturing the filter members illustrated in FIGURES 5 and 6 will now be described. Starting first with a large batt or blanket of foam filter material, indicated generally by the numeral 30, the batt or blanket may be of any suitable size and configuration, and from the batt a plurality of filter elements will be manufactured. The batt 30 is cut or sliced into the desirably sized and shaped filter elements 10 by a wire grid system suitably mounted in a frame or the like, and which includes pluralities of pairs of wires 32 and 34, the wires 32 or 34 in each pair being separated by a distance sufficient to form the peripheral flanges around the filter elements 10. Disposed between each of the wires 32 or 34 in the pairs of wires, are third wires 36 and 38, respectively, which are spaced from the pairs of wires 32 and 34 as best illustrated in FIGURE 2. Suitably connected to the wires 32, 34, 36 and 38 is a heating device, indicated generally by the numeral 40 which may take any suitable form and may be of any suitable kind so as to provide the desired heat in the wires to permit the wires to pass easily through, or partially through, the batt or blanket 30.

When the wires 32, 34, 36 and 38 are passed into the batt 30 in the manner illustrated in FIGURE 2, the pairs of wires 32 and 34 pass partially through the batt 30 and the third wires 36 and 38 pass completely through the batt 30. In so doing, the wires 36 and 38 separate the batt into a plurality of pieces of filter material, and the pairs of wires 32 and 34 create peripheral portions on each of the pieces of filter material. After these cuts or slices are made by the heated wires, the wires are removed from the batt 30 and the portions of the filter material between the cuts made by the third wires 36 and 38 and the pairs of wires 32 and 34 are compressed by a suitable die member, illustrated in dashed and dotted lines at 42 in FIGURE 3, under heat and pressure. The portions thus compressed become dense and compacted to form the peripheral flanges 20 about each of the filter elements 10. The remainder of the filter material in each filter element 10 is undisturbed by the heat and pressure applied at the peripheral flanges.

The next step in the operation is best illustrated in FIGURE 4, wherein a lower mold member, indicated generally by the numeral 44, is provided, having a suitable cavity 46 formed therein and in which is received a quantity of liquid plastic material 48 of any suitable material to eventually form the end plate 12 of the filter member. Lower mold member 44 includes an upstanding post, or the like, 50 to provide the opening or aperture 16 in the end plate 12. After the filter element 10 has the peripheral flange formed thereon, it may be disposed in the lower mold member 44. The liquid plastic material 48 flows into the interstices in the foam material and incorporates the peripheral flange 20 on the filter element 10. The liquid plastic material 48 is then allowed to cure to a hardened stage, where it forms a relatively rigid end plate 12 for the filter member. The incorporation of the peripheral flange 20 in the plastic material strengthens the plastic material and alleviates the warpage and deformation problem that is likely to result from the heat of engine operation in the engine with which the filter member is used.

Referring next to FIGURES 7 through 9, apparatus is shown to carry out another preferred embodiment of the method in which the invention resides. An upper mold member, indicated generally by the numeral 52, has a plurality of cavities 54 formed therein of suitable size and shape for the filter elements which are to be formed, the cavities being separated from each other by lands 56 for purposes to become hereinafter more apparent. Adjacent each of the lands 56 are grooves 58, the purpose for which will also become hereinafter more apparent. Grooves 58 are formed in the upper mold member 52 in a grid-like pattern.

Shown disposed below the upper mold member 52 is a frame structure, indicated generally by the numeral 60, which supports the plurality of cutting wires arranged in parallel pairs 62 and 64, and which are to form the cuts or slices in the foam batt or blanket, indicated generally by the numeral 66. Wires 62 and 64 are connected to frame structure 60 by springs 68, the springs keeping the wires taut as the wires expand and contract due to the heat applied thereto. It will be noted that the grooves 58 in the upper mold member 52 are so located as to receive the wires 62 and 64 therewithin, as illustrated in FIGURE 8.

Shown disposed below the blanket 66 is a lower mold member, indicated generally by the numeral 70, provided with a plurality of cavities 82, the cavities being separated by lands 74 so disposed as to directly underlie the lands 56 on the upper mold member 52. Also formed in the lower mold member 70 are a plurality of posts or bosses 76, centrally located in the cavities 72 to form passages in the end plates, as will become hereinafter more apparent.

In utilizing the above-described structure, the filter blanket or batt 66 is placed over the lower mold member 70 with the cavities 72 being filled with the liquid plastic material 78 of any suitable type sufficient to form end plates on the filter members. The batt thus rests upon the lands 74 and the posts 76, and the frame 60 with the wires 62 and 64 mounted therein, is lowered into the batt or blanket 66 to form partial cuts or slices down to a depth suitable to provide the peripheral flanges as hereinbefore described. After the frame 60 has been lowered to the proper depth to make the cuts or slices 80, the frame 60 is raised so that the wires are disposed within the grooves 58 formed in the upper mold member 52. The upper mold member 52 is then lowered so that the lands 56 compress the portions of the filter batt 66 between the pairs of wires 62 and the pairs of wires 64 against the lower lands 74 formed in the lower mold member 70. The depth of the cavities 54 in the upper mold member 52 are such that as the lands 56 reach their proper depth relative to the lower mold member 70, the major portions of the filter batt 66 will be lightly depressed so that the lower face thereof will be forced into the liquid plastic material 78 in the cavities 72 of the lower mold plate 70. The equipment is left in this position for a suitable period of time to compress and retain the portions of the batt between the cuts or slices 80 and to form the peripheral flanges 20 about the filter member. After this operation is complete, the liquid plastic material 78 is allowed to cure and harden to form the end plates for the filter member. The upper mold member 52 is then removed or raised, and the filter batt and hardened plastic material are removed from the lower mold member 70. The next step in the operation is to separate the filter members from each other, which may be done by any suitable cutting operation midway of the peripheral flanges formed between the lands 56 and 54 in the mold members. Such cutting operation may be done by heated wires, by a suitable cutting die, or in any other manner. Once the peripheral flanges are divided, a complete filter member is provided which may be mounted in the container portions 24 and 26, as shown in FIGURE 10, and over the intake member 22 of the internal combustion engine. The peripheral flanges 20 formed around each of the filter members serves as a lip or seal against the inner wall of the container to prevent air flow therepast. The portions of the filter material embedded in the end plate strengthen and stabilize the end plate to prevent warpage and deformation so as to permit air flow therepast.

Thus, apparatus and method are provided for forming filter members with ease and facility for use with internal combustion engines, or the like, such filter members having relatively stiff or stabilized end flanges and end plates to be used as sealing members against the housing or container within which the filter member is mounted. The heat of operation of the engine will not cause deflection, deformation or warpage of the sealing flanges or end plates so as to permit leakage of air therepast. The method and apparatus hereinbefore described provides great versatility in the size, shape and configuration of the filter members, and is readily adaptable to production manufacture on a high volume basis and may be easily automated.

Changes and modifications to the structures and methods described herein will occur to those having skill in the art, after having had reference to the foregoing description and drawing. However, it is not intended to limit the scope of the invention by the foregoing, but by the scope of the appended claims in which the embodiments of the invention in which an exlusive property or privilege is claimed are defined as follows.

I claim:
1. A method of making a filter element from a batt of foam material and comprising the steps of:
 making a cut partially through said butt around the periphery thereof and inwardly spaced from the edges thereof;
 and compressing and heating the portions of said batt between said cut and said edges of said batt to form a peripheral flange adjacent one end of said batt.

2. A method of making a filter element from a batt of foam material and comprising the steps of:
 making a cut partially through said batt around the periphery thereof and inwardly spaced from the edges thereof;
 compressing the portion of said batt between said cut and said edges of said batt to form a peripheral flange adjacent one end thereof;
 embedding said end of said batt and said peripheral flange in a plastic material in liquid form;
 and securing said plastic matreial to form an end plate on said filter element.

3. The method of making a filter element set forth in claim 2 wherein said cut is made with heated wires.

4. The method of making a filter element set forth in claim 2 wherein said portions of said batt between said cut and said edge are compressed under heat and pressure.

5. A method of making a plurality of filter members from a batt of foam filter material comprising the steps of:
 making a series of first cuts through said batt to separate said batt into a plurality of elements;
 making a series of second cuts partially through said batt and adjacent said first cuts and around the periphery of each of said elements;
 depressing the portions of said batt between said first and second cuts to form a peripheral flange adjacent one end of each of said elements;
 embedding the end of each of said elements and said peripheral flanges in plastic material in liquid form;
 and curing said plastic material to form an end plate on each of said elements.

6. The method set forth in claim 5 wherein said first and second cuts are made with heated wires.

7. The method set forth in claim 5 wherein said first and second cuts are made substantially simultaneously.

8. The method set forth in claim 5 wherein said first cuts are made by heated wires in grid-like form.

9. The method set forth in claim 8 wherein said second cuts are made by heated wires disposed in spaced parallel relation to said wires forming said first cuts and spaced on opposite sides thereof.

10. The method set forth in claim 5 wherein said portions of said batt between said first and second cuts are compressed under heat and pressure.

11. A method of making a plurality of filter members from a batt of foam material comprising the steps of:
 making a plurality of first cuts through said batt with a plurality of heated wire elements formed in a grid-like pattern to separate said batt into a plurality of separate elements;
 making a plurality of second cuts partially through said batt with a plurality of heated wire elements disposed in spaced parallel relation to said plurality of wires making said first cut, said first and second cuts being made substantially simultaneously;
 depressing the portions of said batt between said first and second cuts under heat and pressure to form a compacted peripheral flange about one end of each of said separate elements;
 embedding the end of each of said separate elements and said peripheral flanges in plastic material in liquid form;
 and curing said plastic material to form an end plate on each of said elements.

12. A method of making a plurality of filter members from a batt of foam filter material and comprising the steps of:
 making a series of spaced parallel cuts partially through said batt;
 placing said batt over a mold member having a plurality of cavities therein filled with liquid plastic material;
 compressing said batt to immerse portions thereof in said liquid plastic material in said cavities;
 compressing the portions of said batt between said spaced parallel cuts against said mold member;
 curing said plastic material to form end plates integrally attached to said batt;
 and cutting said portions of said batt compressed between said spaced parallel cuts to separate said batt into a plurality of filter members having peripheral flanges therearound.

13. The method set forth in claim 12 wherein said series of cuts are in grid-like arrangement to define a plurality of polygonal filter elements.

14. The method set forth in claim 12 wherein said cuts are made in said foam material by heated wires.

15. Means for making filter members from a batt of foam filter material and comprising:
 a frame having a plurality of pairs of wires extending thereacross in a grid-like pattern, the wires in each pair of wires being closely spaced relative the next adjacent pair of wires, said wires adapted to be heated for making a plurality of cuts partially through said batt of filter material;
 a lower mold member having a plurality of cavities therein and a plurality of lands between said cavities, said cavities being adapted to be filled with a plastic material in liquid form;
 an upper mold member having a plurality of cavities therein and a plurality of lands between said cavities aligned with said lands on said lower mold member, said upper mold member having a plurality of slots therein adjacent said lands to receive said wires, said upper mold member being receivable over said lower mold member with said batt of filter material therebetween and with the portions of said batt between the cuts made by the wires of said pairs of wires compressed between said lands and with the portions of said batt between the cuts made by said pairs of wires depressed into said plastic material in said cavities in said lower mold member;

whereby curing of said plastic material and removal of said mold members provides a continuous series of filter elements having plastic end plates, said batt being separable along the portions thereof compressed between said lands to provide separate filter members.

References Cited

UNITED STATES PATENTS

| | | | |
|---|---|---|---|
| 3,017,698 | 1/1962 | Hambrecht et al. | 29—552 |
| 3,064,801 | 11/1962 | Linnell | 206—46 |
| 3,080,612 | 3/1963 | Buchmann | 264—321 XR |
| 3,273,327 | 9/1966 | Hoffman. | |
| 3,378,432 | 4/1968 | Spencer | 264—321 XR |

OTHER REFERENCES

German, printed application 1,200,204, August 1961, Dahmen.

JULIUS FROME, *Primary Examiner.*

P. E. ANDERSON, *Assistant Examiner.*

U.S. Cl. X.R.

264—294, 321, 273; 55—502, 511; 18—2, 34, 5; 25—105; 249—83